June 29, 1965

G. DE ANGELIS 3,191,307

METHOD AND APPARATUS FOR DRAWING THREE
DIMENSIONAL VIEWS OF OBJECTS

Filed May 7, 1962

GEORGE DE ANGELIS
INVENTOR

BY
Jerry G. Beck
ATTORNEY

June 29, 1965 G. DE ANGELIS 3,191,307
METHOD AND APPARATUS FOR DRAWING THREE
DIMENSIONAL VIEWS OF OBJECTS
Filed May 7, 1962 2 Sheets-Sheet 2

GEORGE DE ANGELIS
INVENTOR

BY
Jerry G. Beck
ATTORNEY

# United States Patent Office 3,191,307
Patented June 29, 1965

3,191,307
METHOD AND APPARATUS FOR DRAWING THREE DIMENSIONAL VIEWS OF OBJECTS
George De Angelis, 9830 Allen Road, Allen Park, Mich.
Filed May 7, 1962, Ser. No. 192,698
9 Claims. (Cl. 33—77)

This invention relates to a method and apparatus for drawing three dimensional views of objects and more particularly to a method and apparatus for aiding in the preparation of perspective and isometric drawings.

Current methods of preparing three dimensional drawings, such as perspectives, on a sheet of drawing paper require the draftsman to manipulate straight edges, rules, or triangles to achieve a perspective view of the object which does not appear distorted to the viewer. The placement of the straight edge or other drawing tools to draw lines for perspective views depend on the skill and judgment of the draftsman or illustrator in order to maintain the proper angular relationship between the various lines required for the completion of the perspective view. To achieve the proper relationship, all lines are assumed to have a common point of intersection frequently called a vanishing point, on either the left side or the right side of the view being drawn. As the left and right common points of intersection of the various divergent lines do not usually fall on the surface to which the drawing paper is attached or the rule and straight edge are not of sufficient length to extend to these points of intersection, great difficulty is encountered by the draftsman in completing a proper perspective view of the drawing paper.

Complex drafting machines may be used to assist in the drawing of three dimensional views but such machines are expensive and cumbersome, and not readily available to most illustrators or draftsmen, especially to a person working on a portable drawing board.

It is an object of this invention to provide a simple method for preparing three dimensional drawings.

A further object of this invention is to provide an inexpensive drawing apparatus that aids in the preparation of perspective views of objects on drawing paper and may also be utilized as a T-square.

The drawing apparatus embodying the present invention which is used in the preparation of three dimensional views of objects on a sheet of drawing paper comprises a member having a substantially straight edge. A pair of links are universally connected to one end of the member with the connections spaced apart from each other. Each link is provided with a means that permits the links to be connected to a flat surface to which the drawing paper is affixed.

In a preferred embodiment, each link is of equal size and has one end pivotally connected to the one end of the member having a straight edge while the other end of the link is provided with an aperture to receive a fastening means. This permits this other end of each link to be pivotally connected to the flat surface.

The method of this invention utilizes the drawing apparatus as heretofore described to draw a perspective view of an object on a sheet of drawing paper in the following manner: First, two divergent lines are drawn on the drawing paper. The member of the drawing apparatus of this invention is placed on the drawing paper with its straight edge aligned with one of the pair of lines. One of the pair of links is rotated so that it is substantially parallel to the straight edge. Then it is pivotally connected to the surface by one fastening means being extended through its aperture. The other of the pair of links is rotated so as to strike a first arc with the other end of this link. Then the straight edge of the member is aligned with the other of the two diverging lines. A second arc is struck with the other end of the other of the pair of links and at the point of intersection between the first and second arcs, this other end is pivotally connected to the surface by extending a second fastening means through its aperture.

It can be seen that all other lines drawn within the drawing area with the pivotally connected drawing apparatus will intersect in close proximity of the vanishing point without requiring the further alignment of the straight edge with the point of intersection or relying on the judgment of the draftsman to obtain the proper angular relationships between lines. The perspective drawings prepared by the method of this invention are fully acceptable and do not appear distorted although the various divergent lines do not precisely intersect at the common vanishing point due to the linkage arrangement of the drawing apparatus of this invention.

Other objects and advantages of this invention will be made more apparent as this description proceeds particularly when considered in connection wtih the accompanying drawings, wherein.

Figure 1:
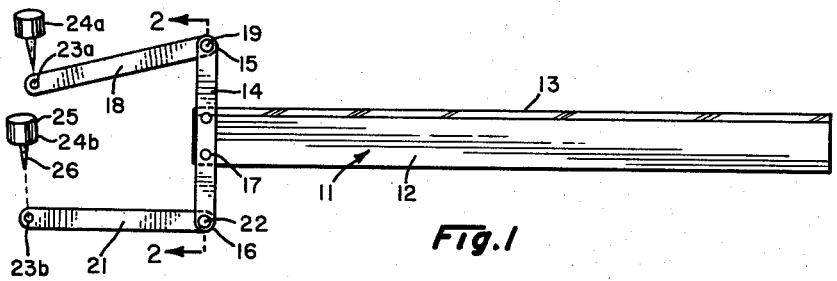
FIGURE 1 is a plan view of the drawing apparatus depicting one embodiment of this invention.
Figure 2:
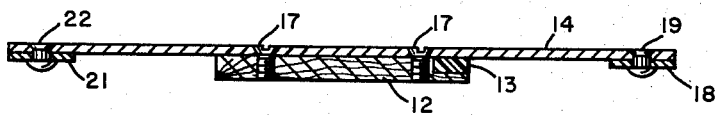
FIGURE 2 is an enlarged sectional view taken along line 2—2 of FIGURE 1.

In FIGURES 1 and 2 is seen a drawing apparatus, generally designated as 11, embodying this invention. The drawing apparatus 11 comprises a first horizontal member 12 having an edge 13 which is substantially straight. To the top surface of one end of the first member 12 is attached to a relatively thin second member 14 which extends normal to the straight edge 13. The second member 14 is secured intermediate its top edge portion 15 and its bottom edge portion 16 to the first member 12 by screws 17. A first link 18 is pivotally connected at one end to the top edge portion 15 of the second member 14 by a rivet 19. A second link 21, which is approximately the same length as the first link 18, is pivotally connected at one end to the bottom edge portion 16 of the second member 14 by another rivet 22.

The other ends of the first link 18 and the second link 21 are provided with apertures 23a and 23b respectively. A pair of fastening pins 24a and 24b are provided. Each fastening pin 24 has a head 25 which is integrally formed with a pin portion 26 as seen in FIGURE 1. The pin portion 26 of each fastening pin 24 may be extended through the apertures 23 into the surface of a drawing table to pivotally connect the other ends of the first link 18 and the second link 21 to the drawing table as hereinafter described.

Figure 3:
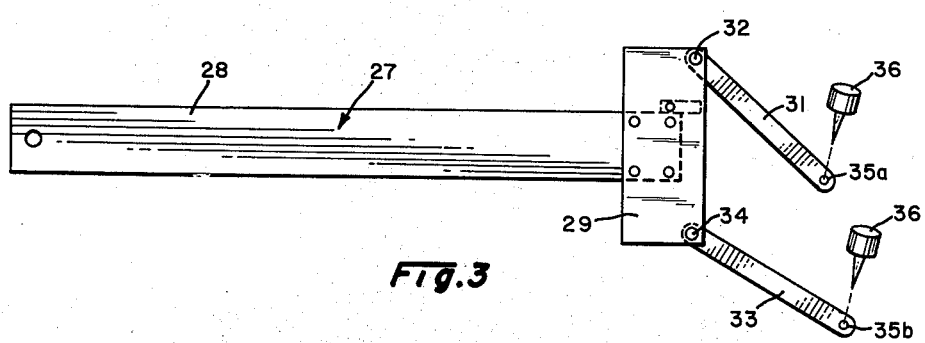
FIGURE 3 is a plan view of a drawing apparatus depicting an alternate embodiment of this invention.
Figure 4:
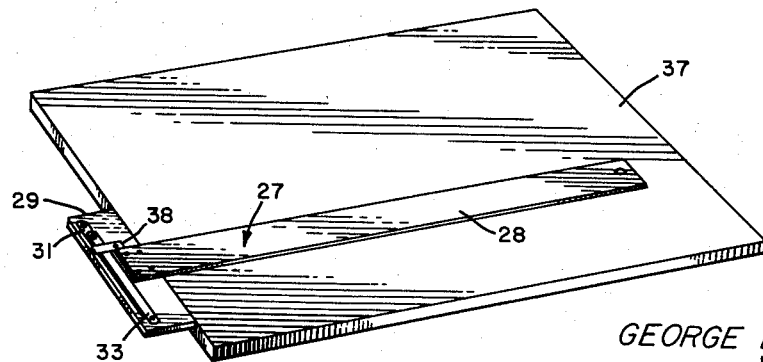
FIGURE 4 is a perspective view of the drawing apparatus shown in FIGURE 3, illustrating its use as a "T-square"

An alternate embodiment of the drawing apparatus, generally designated as 27, is shown in FIGURES 3 and 4. In this embodiment, the drawing apparatus 27 comprises a "T-square" having a straight edge member 28 with a perpendicular cross member 29 at one end thereof. The bottom surface of the cross member 29 is attached to the top surface of the straight edge member 28 so that it extends beyond the edge thereof similar to "T-squares" as known in the art.

The basic "T-square" is converted to the drawing apparatus 27 of this invention by pivotally connecting one end of a first link 31 with a rivet 32 to the bottom surface of the cross member 29 at its outward upper corner. One end of a second link 33 is pivotally connected by a second rivet 34 to the bottom surface of the cross member 29 at its outward lower corner. The first and second links 31, 33 are approximately of the same length and are provided with apertures 35a and 35b respectively. A fastening pin 36 may be extended through each aperture 35 to pivotally connect the other ends of the first and second links 31, 33 to the drawing table as in the first embodiment.

In FIGURE 3, the drawing apparatus 27 is being used to aid in the preparation of a perspective drawing and, therefore, the bottom surfaces of the straight edge member 28 and the cross member 29 are juxtaposed to the surface of the drawing table. A straight edge may be provided at the upper and lower edges of the member 28 and at the inside edge of the cross member 29 as in a conventional "T-square."

When the drawing apparatus 27 is not used for drawing views of three dimensional objects, it may be utilized as a "T-square" by turning the apparatus over and using it on a drawing board 37 in a known manner as seen in FIGURE 4. As the first and second links 31, 33 are not required, the latter are rotated inwardly so that they overlap each other on the bottom surface of the cross member 29 adjacent the end of the straight edge member 28. A retaining member 38 is attached to the bottom surface of the cross member 29. The end of the retaining member 38 engages the outer edges of the overlapping first and second links 31, 33 to retain both links in an inoperative position so as not to interfere with the draftsman using the drawing apparatus 27 as a "T-square."

Figure 5:
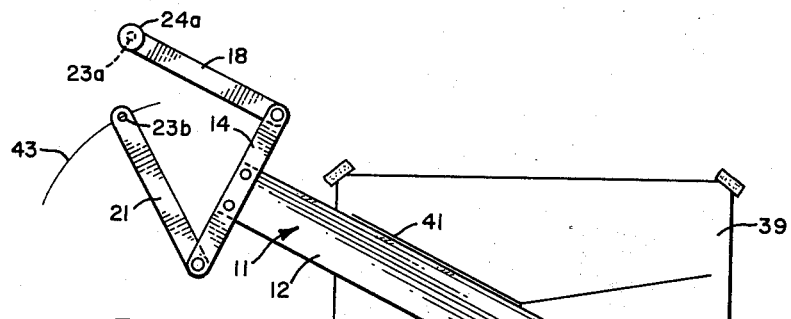
FIGURE 5 is a plan view of the drawing apparatus of the first embodiment shown in FIGURE 1 illustrating one step of the method of this invention.
Figure 6:
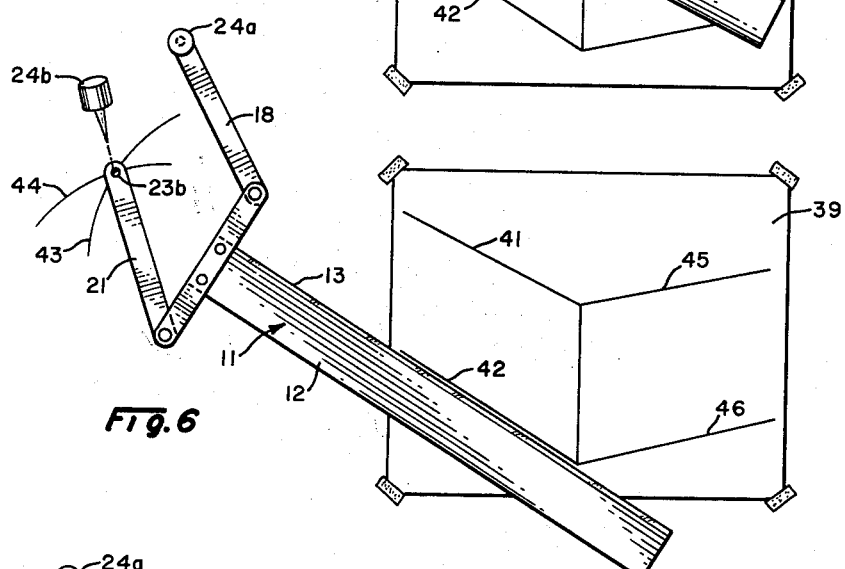
FIGURE 6 is a plan view of the drawing apparatus shown in FIGURE 1 illustrating a further step of the method of this invention.
Figure 7:
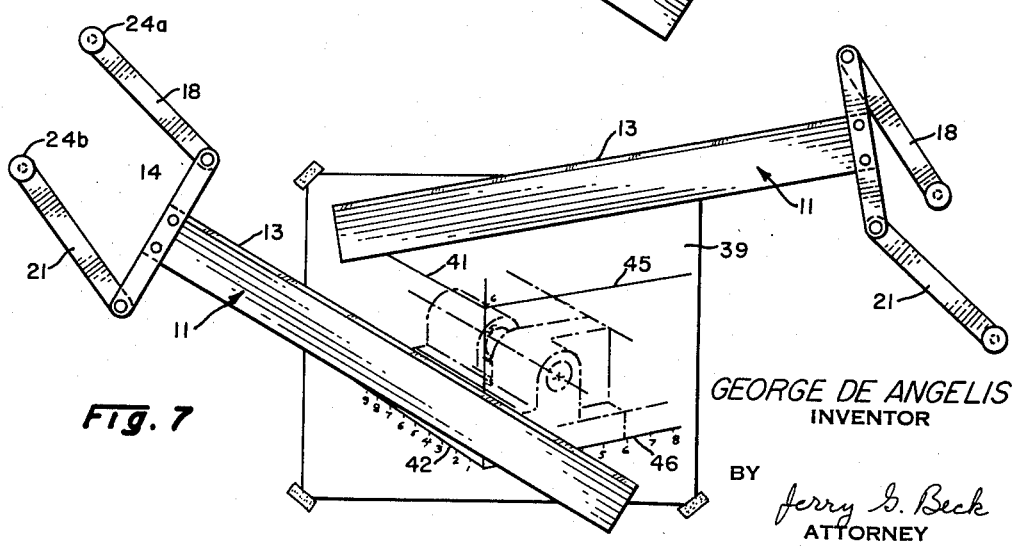
FIGURE 7 is a plan view of the drawing apparatus illustrating still further steps of the method of this invention.

To assist in the preparation of a perspective drawing, the drawing apparatus of the first or second embodiment of this invention may be used as seen in FIGURES 5–7. The method, utilizing the drawing apparatus 11 for instance, comprises the steps of affixing a sheet of drawing paper 39 to a flat surface. A first line 41 is drawn on the paper 39. Then a second line 42 is drawn making an acute angle with the first line 41 so that the extensions of both lines 41, 42 intersect at a vanishing point somewhere to the left of the drawing paper 39 according to known techniques of drawing a perspective view of an object. The angular relationship between the divergent lines 41, 42 is preselected by the draftsman or illustrator, depending on the type of perspective he likes to achieve. To maintain an angular relationship for all other divergent lines required to partially complete the view on the drawing paper 39, the drawing apparatus 11 is placed on the surface so that the straight edge 13 is aligned with line 41 on the drawing paper 39.

The the first link 18 is rotated until it is substantially normal to the second member 14. Fastening pin 24a is pushed through the aperture 23a into the surface of the drawing table to pivotally attach the rotated end of the first link 18 to the drawing table. Without moving the straight edge 13, a sharply pointed pencil or any other scribing means is inserted through the aperture 23b of the second link 21 and a first arc 43 is scribed on the surface as best seen in FIGURE 5.

Now the straight edge 13 is aligned with the second line 42 as seen in FIGURE 6. A sharp pencil is inserted through aperture 23b and a second arc 44 is scribed on the surface so that it intersects the first arc 43. Fastening pin 24b is inserted through aperture 23b of the second link 21 and pushed into the surface of the drawing table at the point of intersection of the first arc 43 and the second arc 44, thereby, pivotally connecting the rotated end of the second link 21 to the drawing table.

All other divergent lines extending from the same vanishing point are drawn by moving the straight edge 13 while the links 18, 21 remain pivotally connected to the drawing table as seen in FIGURE 7. All vertical lines may be drawn by utilizing the vertically extending edge of a triangle that is being moved along the horizontally extending straight edge of any "T-square."

To complete the perspective view on the drawing paper 39, it will be necessary to draw the divergent lines having a common vanishing point to the right of the drawing paper. The same method of this invention may be applied using the same drawing apparatus 11 of this invention. Two new lines 45 and 46 are drawn on the drawing paper 39 as seen in FIGURE 7, and then the first link 18 and second link 21 are pivotally connected after aligning the straight edge 13 with the lines 45 and 46 respectively. The drawing is continued as heretofore discussed.

It can be readily understood that the drawing apparatus 27 of the second embodiment can be employed in the same manner to draw perspective views. The additional advantage obtained with the drawing apparatus 27 is that it may also be used as a "T-square" to aid in the drawing of the vertical lines or for any other drafting purpose upon placing the first link 31 and second link 33 in a retained position as seen in FIGURE 4.

The drawing apparatus of this invention may also be used in the preparation of isometric views on drawing paper. The first and second links can be pivotally connected to the drawing table while being maintained in a parallel relationship to each other.

By using a triangle in conjunction with the straight edge it can be understood that the preparation of isometric views is facilitated.

It can be seen from the foregoing description that the drawing apparatus of this invention is a versatile drawing tool which provides a low cost and effective method for aiding in the preparation of three dimensional views of objects on drawing paper.

It will be further understood that the invention is not to be limited to the exact construction described but that various modifications may be made without departing from the spirit and scope of the invention as defined in the appended claims.

I claim:

1. An apparatus for drawing three dimensional views of objects in combination with a flat surface on which said views are drawn, said apparatus comprising a generally horizontally extending first member having at least one horizontal straight edge, a second member extending generally normal to said first member and having its bottom surface attached intermediate its ends to the top surface and at one end of said first member, the inward side of said second member being a vertical straight edge, a first link having one end pivotally connected to one end at the bottom surface of said second member adjacent its outward side, a second link having one end pivotally connected to the other end at the bottom surface of said second member adjacent its outward side, first means at the other end of said first link for pivotally connecting the latter to said surface, second means at the other end of said second link for pivotally connecting the latter to said surface remote from said first means, and retaining means on said second member to receive said first and second links upon the latter being positioned on the bottom surface of said second member, the distance between said first means and said second means after pivotally connecting said other ends of said first and second links to said surface being less than the distance between said one ends of the first and second links.

2. An apparatus for drawing three dimensional views of an object on a flat surface comprising, in combination, a T-square, said T-square comprising a vertical member secured to one end of a horizontal straight edge member, a first link having one end pivotally connected to one end of the vertical member, a second link having one end pivotally connected to the other end of the vertical member, said first link and said second link being of the same length, the other end of the first link being provided with an aperture, a first detachable fastening means being extended through the aperture at the other end of said first link to pivotally connect the latter to said surface, the other end of the second link being provided with an aperture, a second detachable fastening means being extended through the aperture at the other end of said second link to pivotally connect the latter to said surface, the spacing between the first and second fastening means pivotally connecting said other ends of the first and second links to said surface being less than the distance between the ends of said vertical member, and retaining means on said vertical member to receive portions of said first and second link when the other ends of the latter are in a nonfastened condition.

3. An apparatus for drawing perspective views of objects on a flat surface comprising a member having a substantially horizontally extending straight edge, a first link, said first link having one end pivotally connected to one end of said member, a second link, said second link having one end pivotally connected to said one end of the member, said one end of the first link being remote from said one end of the second link, an aperture in the other end of said first link, an aperture in the other end of said second link, a first readily detachable fastening means, and a second readily detachable fastening means, said first fastening means being received by said aperture of the first link and adapted to pivotally connect the latter to said surface, said second fastening means being received by said aperture of the second link and adapted to pivotally connect the latter to said surface, said first link and said second link being in a nonparallel relationship upon being pivotally connected to said surface.

4. A method for drawing a three dimensional view on a flat surface utilizing a drawing apparatus comprising a member having at least one substantially horizontally extending straight edge, a first link having one end pivotally connected to the end of said member, a second link having one end pivotally connected to said one end of said member remote from said first link, the method comprising the steps of drawing at least two lines on said surface, said lines being arranged so as to have common point of intersection on said surface remote from said intended view, positioning said member on said flat surface so as to align said straight edge with one of said lines, rotating the other end of said first link so that the latter is substantially parallel to said straight edge, pivotally connecting the other end of said first link to said surface, striking a first arc with the other end of the second link, then aligning the straight edge with the second line on said surface, striking a second arc with the other end of said second link so as to intersect said first arc, and pivotally connecting the other end of said second link to said surface at the point of intersection of the first arc and the second arc.

5. A method for drawing a perspective view of an object on a sheet of drawing paper affixed to a flat surface utilizing a drawing apparatus comprising a member having a substantially horizontally extending straight edge, a first link having one end pivotally connected to one end of said member, and a second link having one end pivotally connected to said one end of the member, said pivotaly connections being vertically spaced from each other, the method comprising the steps of drawing two divergent lines, said two lines being arranged so as to have a common point of intersection on said surface remote from the intended view on the drawing paper, positioning said member on said drawing paper so as to align said straight edge with one of said lines, rotating the other end of said first link so that the latter is substantially parallel to said straight edge, pivotally connecting the other end of said first link to said surface, striking a first arc on said surface with the other end of the second link, then aligning the straight edge with the second line on said drawing paper, striking a second arc with the other end of said second link so as to intersect said first arc, pivotally connecting the other end of said second link to said surface at the point of intersection of the first arc and the second arc, and drawing lines with the straight edge of said pivotally connected member to partially complete said view.

6. A method for drawing a perspective view of an object on a sheet of drawing paper affixed to a flat surface utilizing a drawing apparatus comprising a member having a substantially horizontally extending straight edge, a first link having one end pivotally connected to one end of said member, and a second link having one end pivotally connected to said one end of the member, said pivotal connections being vertically spaced from each other, the method comprising the steps of drawing two divergent lines on the drawing paper, said two lines being arranged so as to have a common point of intersection on said surface to the left of the intended view on the drawing paper, positioning said member on said drawing paper so as to align said straight edge with one of said lines, rotating the other end of said first link so that the latter is substantially parallel to said straight edge, pivotally connecting the other end of said first link to said surface, striking a first arc on said surface with the other end of the second link, then aligning the straight edge with the second line on said drawing paper, striking a second arc with the other end of said second link so as to intersect said first arc, pivotally connecting the other end of said second link to said surface at the point of intersection of the first arc and the second arc, drawing lines with the straight edge of said pivotally connected member to partially complete said view, drawing at least two additional divergent lines on the drawing paper, said two additional lines being arranged so as to have a common point of intersection, on said surface to the right of the view on the drawing paper, repeating the steps of aligning the straight edge with the two additional lines and pivotally connecting said first and second links to partially complete said view, and then drawing vertical lines to complete the perspective view of said object on the drawing paper.

7. An apparatus for drawing perspective views in combination with a flat surface on which said views are drawn, said apparatus comprising a first member having a substantially horizontally extending straight edge, a second member extending normal to said straight edge and being attached intermediate its ends to said first member, a first link having one end portion pivotally connected to one end of said second member, a second link having one end portion pivotally connected to the other end of said member, a first means pivotally connecting the other end portion of said first link directly to said surface, and a second means pivotally connecting the other end portion of said second link directly to said surface, said first means and said second means being remote from each other and maintaining said first and second links in a non parallel relationship upon being pivotally connected to said surface.

8. An apparatus for drawing three dimensional views of objects in combination with a flat surface on which said views are drawn, said apparatus comprising a member having a substantially horizontally extending straight edge, a first link having one end pivotally connected to said member, a second link having one end pivotally connected to said member, the pivotal connections at the one end of said first link and at the one end of said second link being spaced apart and lying on a common vertical axis normal to said straight edge, first means pivotally connecting said first link directly to said surface at one point remote from said one end of the first link, and a second means pivotally connecting said second link directly to said surface at another point remote from said one end of the second link, the distance between the first and second means being less than the distance between the pivotal connections at the respective one ends of said first and second links.

9. An apparatus for drawing three dimensional views of an object on a flat surface comprising, in combination, a T-square having a vertical member secured to one end of a horizontal straight edge member, a first link having one end pivotally connected to one end of said vertical member, a second link having one end pivotally connected to the other end of said vertical member, said first link and said second link being of the same length, the other end of said first link being provided with an aperture, a first detachable fastening means extending through the aperture at the other end of said first link to pivotally connect the latter to said surface, the other end of said second link being provided with an aperture, a second detachable fastening means extending through the aperture at the other end of said second link to pivotally connect the latter to said surface, the distance between the first and the second fastening means pivotally connecting the other ends of said first and second links to the surface being less than the distance between the one end and the other end of said vertical member, and retaining means on said vertical member to receive portions of said first and second links when the ends of said links are in a non fastened condition.

References Cited by the Examiner
FOREIGN PATENTS

| | | |
|---|---|---|
| 234,281 | 5/11 | Germany. |
| 411,582 | 2/45 | Italy. |
| 417,177 | 1/47 | Italy. |

ISAAC LISANN, *Primary Examiner.*

ROBERT B. HULL, *Examiner.*